ROBINSON & CHESTER.
Fire Telegraph.
No. 14,032. Patented Jan. 1, 1856.
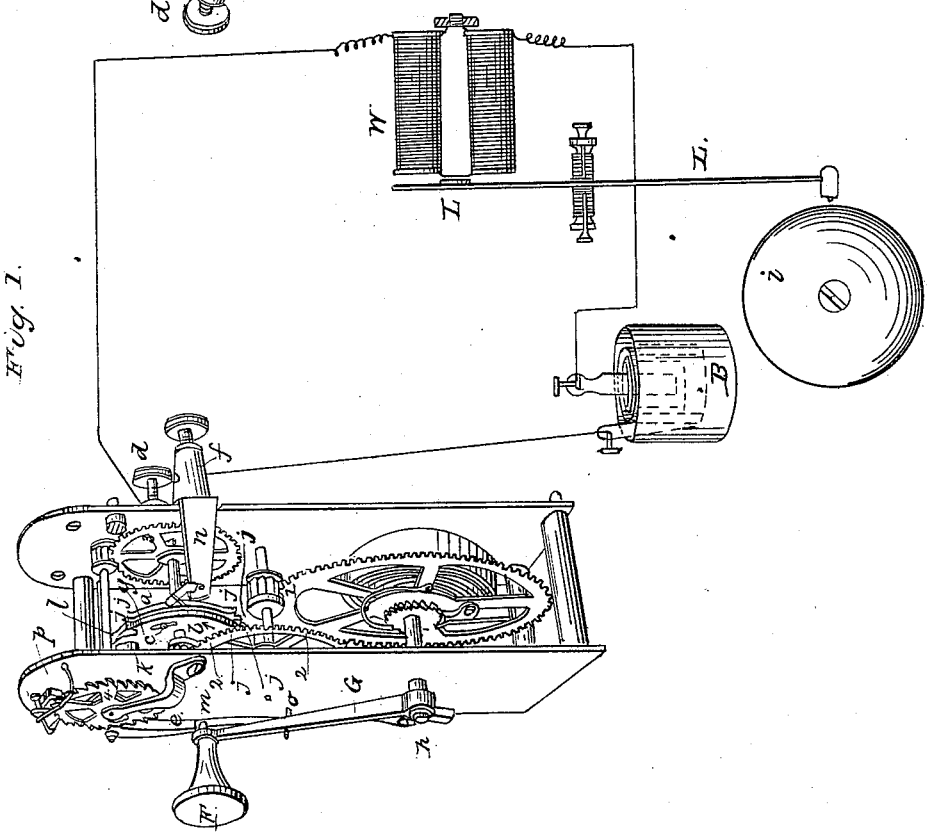

UNITED STATES PATENT OFFICE.

CHAS. ROBINSON AND CHAS. T. CHESTER, OF NEW YORK, N. Y.

IMPROVEMENT IN AUTOMATIC ELECTRICAL CIRCUIT-BREAKERS.

Specification forming part of Letters Patent No. 14,032, dated January 1, 1856.

*To all whom it may concern:*

Be it known that we, CHARLES ROBINSON and CHARLES T. CHESTER, each of us of the city, county, and State of New York, have invented a new and useful Method of Closing and Breaking Electric-Circuits at Regulated Intervals; and we do hereby declare the following to be a full description of the same.

The nature of our invention consists in the manner in which the detent of the clock-work is let down to take effect—viz., by means of a lever forcing back a spring which previously held the detent in its elevated position as will be explained.

To describe our invention more particularly, we will refer to the accompanying drawings, forming a part of this schedule, the same letters of reference wherever they occur referring to the same parts.

Figures 1 and 2 represent a frame with train of wheels actuated by a spring and regulated by the scape-wheel 4 and pallets $p$.

The pinion of the third wheel, 3, carries also two other wheels, $a$ and $b$. The wheel $a$ is fixed to the pinion, and its periphery carries pointed teeth, $jjj$, different in number and separation according to the service they may be required to perform. The wheel $b$ is loose upon the pinion and is fastened in the proper position with reference to the wheel $a$ by the screw $c$, which passes through the curved slot $g$ into the wheel $a$. This wheel, $b$, has on its periphery but one indentation, $k$, fitted to receive the end of the lever $l$. This lever $l$ is attached to a shaft, $ss$, which carries, also, external to the frame Fig. 2, another lever, $l'$. A stout spring, $ee$, bears against the lever $l'$, and while thus bearing against it the lever $l$ is kept raised, its tongued end out of the indentation in wheel $b$, which is free to revolve. If the tension of the spring $ee$ be withdrawn the two levers drop, (by gravity if machine be kept in position represented in drawings, or by spring if in any other position be desirable,) and the end of lever $l$ resting on the periphery of the indented wheel $b$ falls into the indentation as soon as the wheel revolves to the proper position. Now, the shaft of the main wheel $h$ carries a handle or lever, G, terminating in the knob F and resting, when the machine is quiescent, against the pin $o$ and also bearing against spring $ee$ and removing its pressure on the lever $l'$.

The action of these parts is as follows: By pushing the knob F to the right the spring is correspondingly wound up, and acting on the train impels the wheels $a$ and $b$ in the direction of the arrow. At the same moment the spring $ee$ being liberated bears against lever $l'$, and elevates lever $l$, releasing wheel $b$ which immediately commences its revolution. When the revolution of wheel 1 carries the handle G against the spring $e$, the lever will again drop into its position in wheel $b$ and hold the train firmly until its liberation.

The relation of the wheel $a$, which may be called the "circuit-wheel," to these parts is best shown in Fig. 1. $f$ and $d$ are binding-screws for the attachment of wires. $d$ is secured into and connects with the frame and hence with the circuit-wheel. $f$ is insulated from the frame by wing $n$. A slip of brass is attached to $f$, and carries a slip of platina, $q$. As the wheel $a$ revolves its points $jjj$ are brought into successive contact with the platina slip. It only needs the circuit shown by the red lines, the battery B, and the magnet W, with its lever L, and arrangement for striking a bell to show the application of this breaking and closing of the circuit. As each point comes into contact with the platina, one stroke is given to the bell, so the number, relative position, and arrangement of the teeth $jjj$ determine with accuracy the signals on the bell.

If it be desirable during the quiescent state of the machine to leave the circuit open, the relative position of the wheels $a$ and $b$ is so arranged by the screw $c$ that on the stopping of the machine by lever $l$ the platina strip is opposite a blank spot on the circuit-wheel. If a closed circuit be desired, one of the teeth $jj$, which is to insure good conduction and perfect contact, faced with platina, brought up to and remains in contact with the platina strip.

The especial object of this invention, as described above, is to enable an inexperienced person, with no other operation than the pushing or pulling of a button, to break and close electric circuits with an accuracy and certainty that the most experienced manipulator cannot equal. It repeats these signals as long as may be deemed necessary, and then having performed its task it leaves the circuit ready for other operations.

If, in connection with the apparatus, a small magnet and bell be arranged and placed within one box, leaving only the handle knob, or button F outside, and then different machines each having a circuit-wheel adapted to striking a different signal be placed in different prominent positions—as, for instance, the engine-houses of a large city—and an electric circuit be established through each machine and a grand central and recording station, it is evident that the button of one machine being pulled by any person each and every bell attached to the other machines and the central station will ring out a number of strokes corresponding with the circuit-wheel of that machine. Now, if two strokes, a pause, and then three strokes be allowed to represent the No. 23, it is evident that any person near to any one of the many machines connected with the electric-circuit will hear repeatedly rung out the signal 23, and understanding the purpose of these machines will understand that a signal-alarm is being sent from the machine or the district No. 23, through the whole ramification of the electric circuit.

It is evident from the construction of this machine that no person can cause it to strike any other than its own signal, because he cannot touch any part of the apparatus but the external button.

Now, we are aware that circuit-wheels with teeth revolving and coming in contact with pieces of metal have been and are used to convey signals; but we know, from repeated trials with these wheels, that are turned by a crank in the operator's hand, that it is very difficult for even a skillful person to break and close an electric circuit with precision and accuracy. An excited person wishing to signalize an alarm of fire would certainly be more liable to turn the wheel with haste and irregularity. The model accompanying these specifications exhibits the fastest speed which we find it practicable to give our circuit-wheels.

Where signals requiring a large number of strokes and but brief pauses necessary, the pauses must be made with mechanical accuracy or the whole signal becomes perfectly unintelligible. If the crank turn more easily in one part of its revolution than another its motion is sure to be correspondingly accelerated without the greatest care. It is thus very possible and very likely that a signal altogether wrong may be communicated; but by our arrangement neither an ignorant, excited, or mischievous person can cause the machine to do otherwise than strike its own perfect signal.

We do not claim the circuit-wheel as a method of breaking and closing electric-circuits mechanically; nor do we claim any peculiar use of these interruptions of circuit for ringing or recording signals; nor do we claim the use of clock-work for operating a break-circuit signal-wheel and regulating its motion, as that is not new; nor do we claim the matter of making the break-circuit signal-wheel stop at a point where it shall leave the circuit closed or at a point where it shall leave it open, since in the apparatus described in Silliman's Journal, Second Series, Vol. 13, the break-circuit signal-wheel is made to rest at the desired point for leaving the circuit closed by the weight of its crank; but What we do claim as new, and desire to secure by Letters Patent, is—

The manner in which the detent of the clock-work is let down to take effect—viz., by means of the lever G pushing back a spring, $e$, which previously held the detent in its elevated position.

CHAS. ROBINSON.
CHARLES T. CHESTER.

Witnesses:
  I. N. CHESTER,
  THOS. L. CHESTER.